Sept. 10, 1929.　　　　J. O. HUNT　　　　1,727,980

MEAT HOLDER

Filed Nov. 20, 1926

INVENTOR
John O. Hunt
BY
his ATTORNEYS

Patented Sept. 10, 1929.

1,727,980

UNITED STATES PATENT OFFICE.

JOHN O. HUNT, OF BROOKLYN, NEW YORK, ASSIGNOR TO BIAGIO A. FURIATI, OF BROOKLYN, NEW YORK.

MEAT HOLDER.

Application filed November 20, 1926. Serial No. 149,557.

The object of the present invention is the provision of a meat holder adapted to receive and clamp and thus hold meat in position so that it may be readily carved. I am aware that heretofore various forms of meat holders have been employed for somewhat similar purposes. So far as the same have come to my attention, however, these meat clamps have been constructed to so clamp the meat as to hold the same in such a manner as to be cut transversely or across the grain of the meat. In certain kinds of prepared meat, for example hams which are cured in a manner peculiar to an Italian custom the meat is not only elongated but when carved is cut longitudinally of the grain, that is with the grain rather than across the grain.

The meat holder made in accordance with my present invention is particularly adapted to receive and clamp pieces of meat, as hams for example, which have been somewhat elongated in their treatment in being cured and which is adapted for use in Italian and other delicatessen shops as well as other places where according to custom in carving the meat the same is cut longitudinally of the grain.

Figure 1:
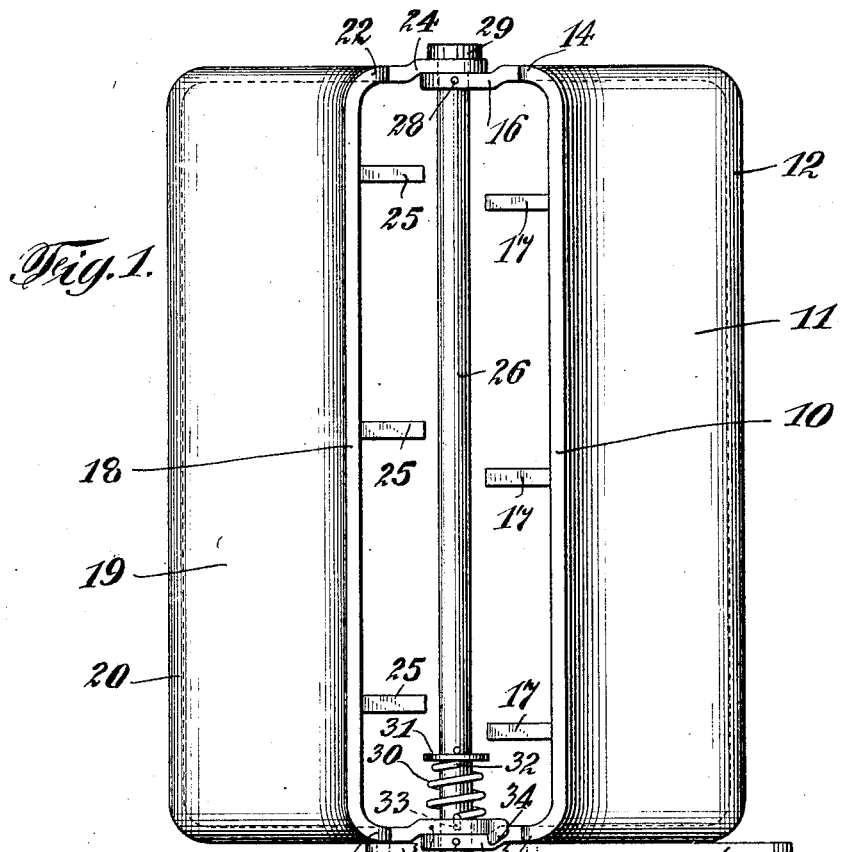
Figure 2:
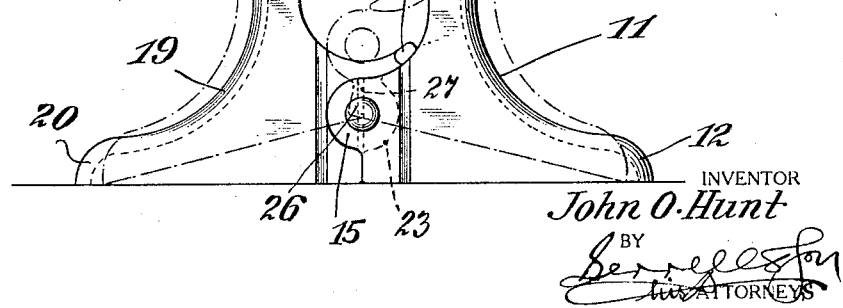

The meat holder made in accordance with this invention will be hereinafter more particularly described in conjunction with the accompanying drawings in which Figure 1 is a plan of a meat holder constructed in accordance with this invention, and Fig. 2 is an end elevation thereof.

The meat holder constructed in accordance with my present invention comprises two similarly formed members pivotally connected in oppositely disposed positions and adapted to receive and grip and thereby secure a piece of meat in such a position that in carving the same the cuts are made lengthwise or longitudinally of the grain instead of crosswise of the grain. Referring to the drawing one of the members comprising the meat clamp is constructed to include an upstanding wall 10 having an outwardly extending flange 11 running parallel therewith adjacent its lower portion and terminating in a base or foot 12. The extremities of the wall 10 extend outwardly therefrom as indicated at 13 and 14 and terminate in offset lugs 15 and 16 adjacent the lower portion of this member of the holder. In suitably spaced positions as indicated, the wall 10 is provided with brackets 17.

The other member of the meat holder is a counter part of that hereinbefore described and comprises an upwardly extending wall 18 having an outwardly extending flange 19 in the lower portion thereof terminating in a base or foot 20. The end portions of the wall 18 are turned outwardly therefrom as indicated at 21 and 22 and the extremities terminate in offset lugs 23 and 24 corresponding respectively with the lugs 15 and 16 in the other member of the holder. In suitably spaced positions the wall 18 is provided with brackets 25 corresponding in height to the bracket 17 carried by the wall 10.

The members of the meat holder as hereinbefore described are assembled as illustrated in the drawing by placing the outer face of the lug 16 in contact with the inner face of the lug 24 and the inner face of the lug 15 in contact with the outer face of the lug 23. The parts are connected by a spindle or shaft 26 which passes through apertures provided for this purpose in the said lugs. Preferably the lugs 15 and 16 are connected to the spindle by means of pins 27 and 28 with the outer face of the lug 24 in contact with a head or flange 29 on the spindle 26 so as to maintain the members in their associated relationship on the spindle on which they are thus mounted to swing relatively to each other.

In order to cause the faces of the lugs 23 and 24 to frictionally engage the faces of the lugs 15 and 16 with sufficient pressure to normally maintain the members of the holder in substantially any position in which they may be placed, I may employ a spring 30 surrounding an end portion of the spindle and extending between a collar 31 placed on the spindle for this purpose and the adjacent face of the lug 23, one end 32 of the spring bearing against the collar 31 and the other end 33 of the spring bearing against the adjacent face of the lug 23. Furthermore, in order to maintain the members of the meat holder in a normal position in which the upwardly extending walls 10 and 18 are substantially parallel one or more of the end lugs may be provided with an extension adapted to engage a portion of the surface of an adjacent end lug, for example as shown in the drawing the lug 23 may be provided with an extension 34 adapted when the parts are in their normal position as aforesaid to engage the adjacent upper portion of the lug 15 to limit the extent of the movement of the upwardly extending walls toward each other and to fix them in a substantially horizontal position as indicated in full lines in Fig. 2 of the drawing.

In the use of the meat holder as hereinbefore described the members thereof are normally in the position shown in full lines in the drawing and in placing an elongated piece of meat or other material in the holder the upwardly extending walls are moved outwardly for example to the dotted line positions as illustrated in Fig. 2, and the meat placed between the walls so as to rest upon the brackets 17 and 25 whereupon due to the weight of the meat the members of the holder tend to swing in the opposite direction and to clamp the meat in position between the walls 10 and 18, it being understood that the major portion of the meat extends sufficiently far above the upper edges of the walls to be cut longitudinally, that is with the grain of the meat rather than across the same. It will also be understood that manually or otherwise, sufficient pressure may be placed upon the members of the holder to securely maintain the meat in position while being carved, and in addition to what is hereinbefore described, any suitable locking or latching device may be attached to the end portions of the upwardly extending walls, a cross link 35 being illustrated for this purpose. This cross link is connected to an end portion of the wall 18 as indicated at 36 and is provided with a series of notches 37 any one of which may be engaged by a pin 38 extending from the corresponding end portion of the wall 10. This however, as hereinbefore stated, is merely illustrative and may be used or may be dispensed with in the construction of the holder made in accordance with this invention.

I claim as my invention:

1. A meat holder comprising similarly constructed oppositely disposed members each having an upwardly extending wall with an offset lug at both ends of each of the said walls, a spindle passing through the said lugs for pivotally connecting the said members to each other permitting the said walls to swing toward and away from each other, and means associated with the said walls for supporting a piece of meat when placed between the same, the said walls being adapted to engage and clamp the meat in position between them, with a portion of the meat extending above the said walls to be in a position to have the outer portion thereof sliced longitudinally of the grain.

2. A meat holder comprising similarly constructed oppositely disposed members each having an upwardly extending wall with an offset lug at both ends of each of the said walls, a spindle passing through the said lugs for pivotally connecting the said members to each other permitting the said walls to swing toward and away from each other, means associated with the said walls for supporting a piece of meat when placed between the same, the said walls being adapted to engage and clamp the meat in position between them with a portion of the meat extending above the said walls to be in a position for slicing longitudinally of the grain, and means for causing a lug on one member to frictionally engage a lug on another member to maintain the said members in substantially any position in which they may be placed.

3. A meat holder comprising similarly constructed oppositely disposed members each having an upwardly extending wall with an offset lug at both ends of each of the said walls, a spindle passing through the said lugs for pivotally connecting the said members to each other permitting the said walls to swing toward and away from each other, means associated with the said walls for supporting a piece of meat when placed between the same, the said walls being adapted to engage and clamp the meat in position between them with a portion of the meat extending above the said walls to be in a position for slicing longitudinally of the grain, and means for limiting the movement of the said walls toward each other causing the said walls in their normal positions to assume a substantially parallel relationship.

4. A meat holder comprising two similarly constructed oppositely disposed members each having an upstanding wall with offset lugs at the extremities thereof, series of brackets extending outwardly from the said walls, a spindle passing through the said lugs for pivotally connecting the said members to each other, a collar on the said spindle, a spring surrounding a portion of the spindle and extending between the said collar and the adjacent face of a lug on one of the said members for causing sufficient friction between the said lugs to maintain the said members in substantially any position in which they are placed, means for fixing the position of the said spindle relatively to the lugs on the other of the said members, and a projection on a lug of one of the said members adapted to engage one of the lugs on the other member to limit the movement of the said walls toward each other and causing the said walls to be substantially parallel when the said members are in their normal positions.

Signed by me this 5th day of November, 1926.

JOHN O. HUNT.